United States Patent [19]

Kops

[11] 3,884,420
[45] May 20, 1975

[54] TRUNNION BEARING SUPPORT SYSTEM

[75] Inventor: Lucian Kops, Montreal, Quebec, Canada

[73] Assignee: Dominion Engineering Works Limited, Quebec, Canada

[22] Filed: Dec. 3, 1973

[21] Appl. No.: 421,227

[52] U.S. Cl. .................................. 241/176; 308/9
[51] Int. Cl. ...................... B02c 17/18; F16c 17/16
[58] Field of Search ........................ 241/176; 308/15

[56] References Cited
UNITED STATES PATENTS 1,747,609  2/1930  Treschow ..................... 241/176 X
1,919,489  7/1933  Treschow ..................... 241/176 X
2,486,477  11/1949  Kennedy ..................... 241/176 X

FOREIGN PATENTS OR APPLICATIONS 2,049,402  4/1971  Germany ........................... 308/9

Primary Examiner—Roy Lake
Assistant Examiner—E. F. Desmond
Attorney, Agent, or Firm—R. A. Eckersley

[57] ABSTRACT

The trunnion bearings for a grinding mill, such as an autogenous ore reduction mill are supported on a simple low cost supporting pedestal, providing two degrees of accommodation of the trunnion under varying deflections due to changes in load conditions.

3 Claims, 4 Drawing Figures

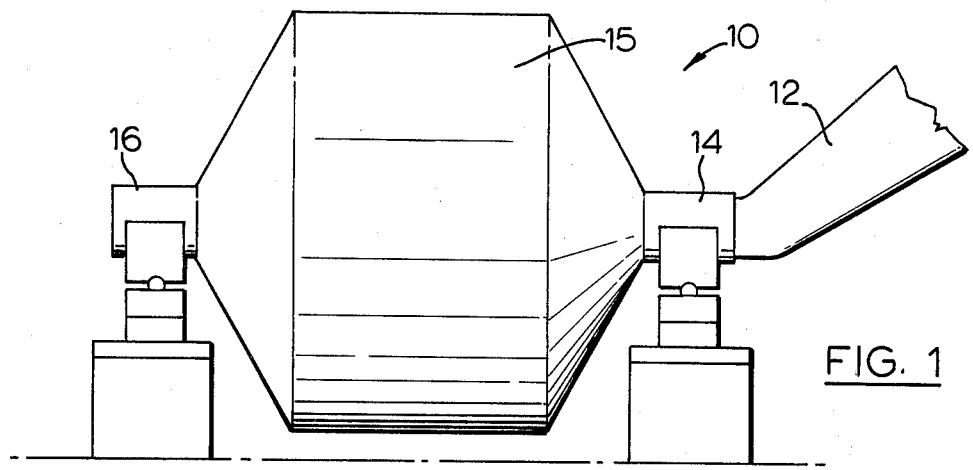
FIG. 1
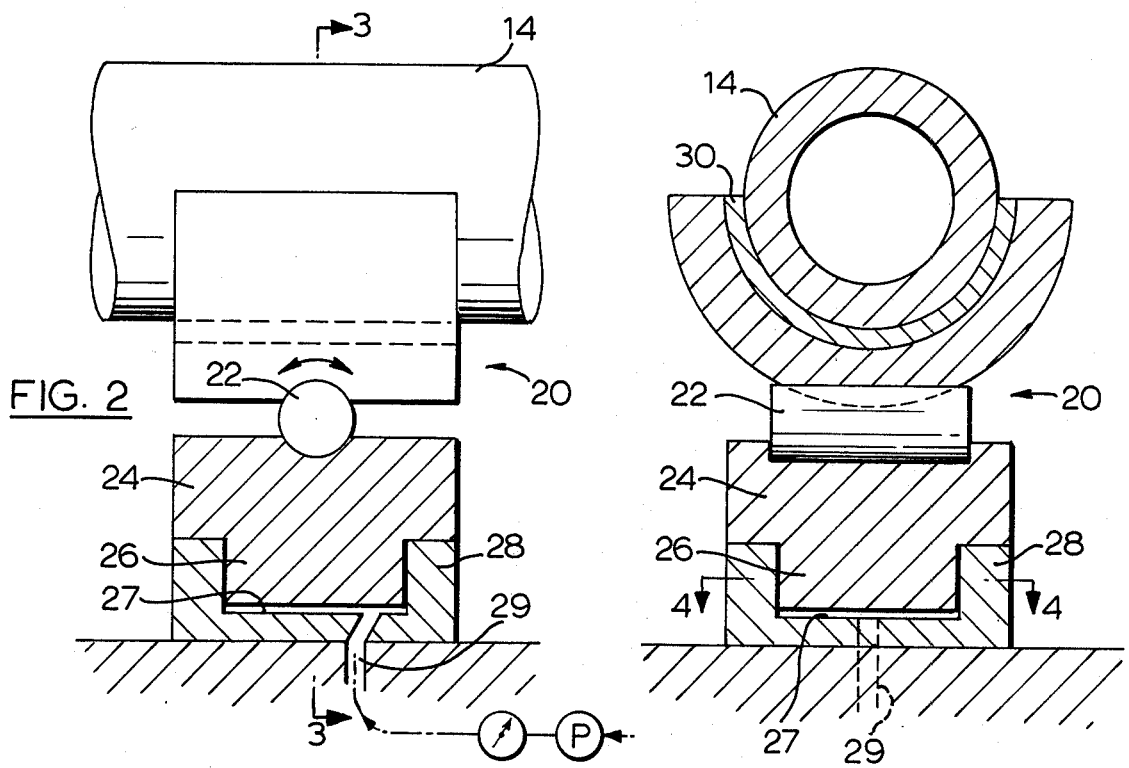
FIG. 2
FIG. 3
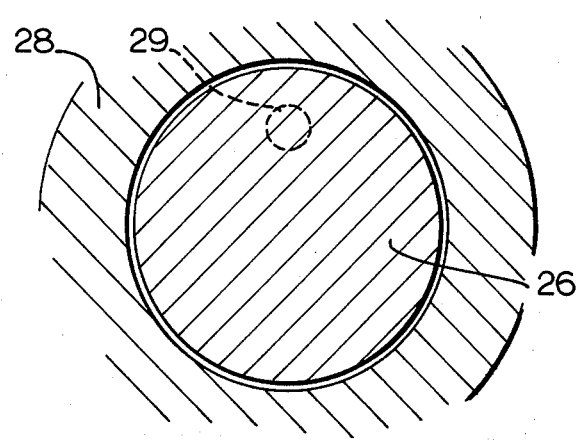
FIG. 4

TRUNNION BEARING SUPPORT SYSTEM

This invention is directed to a bearing support and in particular to a bearing support for a trunnion shaft, in combination with a grinding drum structure supported thereby.

In the operation of grinding mills such as ore grinding mills, which includes ball, rod and autogenous mills, the load carried by the mill can vary quite considerably. This in turn leads to variations in loading of the mill structure and also its support bearings, with a consequent need for accomodation in the support trunnions, including flexing of the support trunnions.

Previous arrangements for accommodating to flexure of the trunnions and of the supporting mill structure, in order to ensure uniformity of load transfer between a trunnion and its supporting shell, have included universal ball arrangements, having a ball and socket arranged in supporting relation with the housing of each of a plurality of bearing pads, to provide universal self-adjustment of the shell with the trunnion and the supporting structure.

Such prior ball and socket arrangements suffer from a number of disadvantages, including high cost owing to the need to generate male and female spherical surfaces, and increased complexity owing to the use of two or more slipper-like bearings, with their associated support and lubrication requirements.

The present invention provides a bearing support wherein the bearing shell has a first support means providing freedom to accommodate in a first plane, and a second shell support means providing stable support to the first support means and permitting a degree of freedom of accommodation of the bearing shell about a substantially vertical axis, whereby the combined components of accommodation permit stable accommodation of the bearing shell to variations of inclination of a shaft supported by the shell.

Certain embodiments of the invention are described, reference being made to the accompanying drawings, wherein FIG. 1 is a side elevation of a grinding mill incorporating bearings according to the present invention;

FIG. 2 is an enlarged view in part section of a bearing shown in FIG. 1;

FIG. 3 is a diametrical section taken at 3—3 in FIG. 2; and

FIG. 4 is a section at 4—4 of FIG. 3.

Referring to the drawings, in FIG. 1, the mill 10 has a feed chute 12 supplying the mill drum 15 by way of a hollow trunnion 14. The two trunnions 14, 16 are carried in bearing shoes supported on structure built in accordance with the present invention.

Thus, in FIG. 2, the trunnion 14 is supported by a shell carried in a bearing housing 20. A pivot cylinder or bar 22 located centrally of the housing 20 in an axial sense, is carried by a lower support pad 24. Lubrication by grease or an oil supply is normally provided.

The support pad 24, shown diametrically sectioned, has a recessed cylindrical foot portion 26 extending therefrom received in a cylindrical recess 27 of the pedestal 28. An oil supply line 29 provides lubricating oil under pressure, to lubricate the surfaces of pad 24 and foot portion 26 which contact surfaces of the pedestal 28.

In FIG. 3 can be seen the shell 30 on which the trunnion 14 revolves.

Owing to the axially centralized position of the pivot bar 22 in relation to the bearing housing 20, the bar 22 provides stable pivoting support to the housing 20, permitting the trunnion 14 and fell 30 to maintain constant bearing contact.

Transverse eccentricity of the trunnion 14 in relation to the mill, which creates a wobble, is accommodated by the pad 24 and its foot portion 26 oscillating within the recess 27 about a vertical axis. The other component of wobble is accommodated by variable canting of the housing 20 upon bar 22, as indicated by the double headed arrow in FIG. 2.

It will be appreciated that the presently disclosed structure is a low cost stable structure permitting ready accommodation of the mill bearing to changes in working conditions.

It will be further understood that with the foot portion 26 floated under oil pressure in the chamber or recess 27, if the shoulders of pad 24 are raised clear of the pedestal 28, the oil pressure in the recess 27 will be a direct measure of trunnion load, and hence can be used to measure the mill charge. This feature may be utilized to control mill feed.

With reference to the stability of the bearing components prior to "dropping" the trunnions into their respective bearings, the degree of "canting" of a respective housing 20 about its prior bar 22 as indicated by the double headed arrow, may be basically restricted by limiting the clearance of the housing 20 from the top surface of the pad 24.

Alternatively, temporary spacers or jacking screws may be provided to maintain the journal surface level, to receive the respective trunnion, upon assembly. After assembly, no such positioning or restraining means need be used.

What I claim as new and desire to secure by Letters Patent of the United States is:

1. A grinding mill having a drum mounted for rotation about a horizontal axis supported for rotation on a pair of end trunnions, each trunnion having trunnion support means including a bearing shoe to receive the respective trunnion for rotation therein, a housing to support said shoe, housing pivot bar means having the axis thereof extending horizontally, in a direction transversely of the mill in relation to the trunnion main axis to permit pivoting of said housing with a single degree of freedom about said horizontal axis, and support pad means beneath said pivot means rotatably mounted in a circular recess having the axis thereof extending substantially vertically to permit oscillation of said housing with a single degree of freedom about a substantially vertical axis, whereby eccentricities between a said trunnion and said drum are accommodated by and limited to oscillation of the trunnion about a horizontal axis substantially at right angle to the trunnions and about a vertically extending axis.

2. The grinding mill as claimed in claim 1 wherein said support pad means includes pressurized lubrication means to support said support pad means by way of a recessed cylindrical foot, and means to monitor the pressure of lubricant required to raise said drum by said foot to permit determination of the loading on said bearing shoe.

3. The grinding mill as claimed in claim 1 wherein said support pad means comprises a portion of a piston and cylinder, having pump means connected thereto to introduce pressurized liquid in trunnion supporting relation, to permit determination of the vertical load acting on the related said trunnion.

* * * * *